United States Patent
Tanabe et al.

(10) Patent No.: US 10,854,071 B2
(45) Date of Patent: Dec. 1, 2020

(54) ELECTRONIC DEVICE, CONTROL METHOD, AND NON-TRANSITORY COMPUTER-READABLE MEDIUM

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/194,445

(22) Filed: Nov. 19, 2018

(65) Prior Publication Data

US 2019/0103018 A1  Apr. 4, 2019

Related U.S. Application Data

(63) Continuation of application No. PCT/JP2017/019695, filed on May 26, 2017.

(30) Foreign Application Priority Data

May 27, 2016 (JP) ................................. 2016-106203

(51) Int. Cl.
| | |
|---|---|
| G08G 1/005 | (2006.01) |
| H04M 1/725 | (2006.01) |
| G08G 1/16 | (2006.01) |
| G01C 21/20 | (2006.01) |

(52) U.S. Cl.
CPC ............. *G08G 1/005* (2013.01); *G01C 21/20* (2013.01); *G08G 1/162* (2013.01); *H04M 1/72572* (2013.01); *G08G 1/166* (2013.01); *H04M 1/72569* (2013.01)

(58) Field of Classification Search
CPC ..... G08G 1/005; G08G 1/166; H04M 1/72572; B60Q 9/008
USPC ........................................................ 340/944
See application file for complete search history.

(56) References Cited

U.S. PATENT DOCUMENTS

| | | | |
|---|---|---|---|
| 9,718,405 B1* | 8/2017 | Englander | B60K 35/00 |
| 2014/0051346 A1* | 2/2014 | Li | H04W 4/046 |
| | | | 455/3.01 |
| 2015/0109148 A1* | 4/2015 | Cheatham, III | G08G 1/005 |
| | | | 340/944 |

(Continued)

FOREIGN PATENT DOCUMENTS

| | | |
|---|---|---|
| JP | H11-120483 A | 4/1999 |
| JP | 2002-352382 A | 12/2002 |

(Continued)

*Primary Examiner* — Emily C Terrell
(74) *Attorney, Agent, or Firm* — Studebaker & Brackett PC

(57) ABSTRACT

Provided is an electronic device including a storage configured to store map data, and at least one processor configured to generate information indicating a trajectory of a user's movement based on a transition of a position of the user of the electronic device. The at least one processor is further configured to acquire the map data corresponding to a current position of the user, and execute at least one of notification to the user and notification to outside when it is detected that the user is to cross a road based on a positional relationship between a position of the road on a map specified from the acquired map data and the trajectory of the user's movement.

13 Claims, 3 Drawing Sheets

(56) References Cited

U.S. PATENT DOCUMENTS

| | | | | |
|---|---|---|---|---|
| 2016/0093207 A1* | 3/2016 | Di Censo | ............. | H04R 1/1091 |
| | | | | 340/944 |
| 2016/0343256 A1* | 11/2016 | Song | ........................ | H04L 67/26 |
| 2017/0268896 A1* | 9/2017 | Bai | ........................ | G01C 21/36 |
| 2018/0114435 A1* | 4/2018 | Singh | ...................... | G06F 3/016 |
| 2018/0255426 A1* | 9/2018 | Liao | .................... | G06F 3/04883 |

FOREIGN PATENT DOCUMENTS

| | | |
|---|---|---|
| JP | 2009-063587 A | 3/2009 |
| JP | 2009-116753 A | 5/2009 |
| JP | 2011138250 A | 7/2011 |
| JP | 2013-205868 A | 10/2013 |
| JP | 2013-239853 A | 11/2013 |
| JP | 2015162019 A | 9/2015 |
| JP | 2015184834 A | 10/2015 |

* cited by examiner

ELECTRONIC DEVICE, CONTROL METHOD, AND NON-TRANSITORY COMPUTER-READABLE MEDIUM

CROSS-REFERENCE TO RELATED APPLICATION

The present application is a continuation based on PCT Application No. PCT/JP2017/019695 filed on May 26, 2017, which claims the benefit of Japanese Application No. 2016-106203, filed on May 27, 2016. PCT Application No. PCT/JP2017/019695 is entitled "ELECTRONIC DEVICE, CONTROL METHOD, AND CONTROL PROGRAM", and Japanese Application No. 2016-106203 is entitled "ELECTRONIC DEVICE, CONTROL METHOD, AND CONTROL PROGRAM", the content of which are incorporated by reference herein in their entirety.

FIELD

The present application relates to an electronic device, a control method, and a non-transitory computer-readable medium.

BACKGROUND

Conventionally, there is an electronic device that notifies a user of the self-device or another device at a predetermined timing.

SUMMARY

Disclosed herein are an electronic device, a control method of the electronic device, and a non-transitory computer-readable medium. In one embodiment, an electronic device includes a storage configured to store map data, and at least one processor configured to generate information indicating a trajectory of a user's movement based on a transition of a position of the user of the electronic device. The at least one processor is further configured to acquire the map data corresponding to a current position of the user, and execute at least one of notification to the user and notification to outside when it is detected that the user is to cross a road based on a positional relationship between a position of the road on a map specified from the acquired map data and the trajectory of the user's movement.

In another embodiment, a control method is a control method executed by an electronic device including a storage configured to store map data. The control method includes a step of generating information indicating a trajectory of a user's movement based on a transition of a position of the user of the electronic device. The control method includes a step of acquiring the map data corresponding to a current position of the user, and executing at least one of notification to the user and notification to outside when it is detected that the user is to cross a road based on a positional relationship between a position of the road on a map specified from the acquired map data and the trajectory of the user's movement.

In yet another embodiment, a control program is stored in a non-transitory computer-readable medium. A control program is configured to control an electronic device to execute the following steps. The control program controls the electronic device to execute a step of generating information indicating a trajectory of a user's movement based on a transition of a position of the user of the electronic device. The control program controls the electronic device to execute a step of acquiring map data corresponding to a current position of the user, and executing at least one of notification to the user and notification to outside when it is detected that the user is to cross a road based on a positional relationship between a position of the road on a map specified from the acquired map data and the trajectory of the user's movement.

DETAILED DESCRIPTION

A plurality of embodiments for executing an electronic device, a control method, and a control program according to the present application will be described in detail with reference to the drawings.

Hereinafter, as an example of the electronic device according to the present application, a smartphone will be described. The electronic device may be a device other than a smartphone as long as a device is portable for the user, and a mobile phone, a tablet, a portable personal computer, a digital camera, a media player, an electronic book reader, a navigator, a pedometer, an activity meter a head mounted display, a hearing aid, an earphone, a game machine, and so forth may be applicable.

Figure 1:
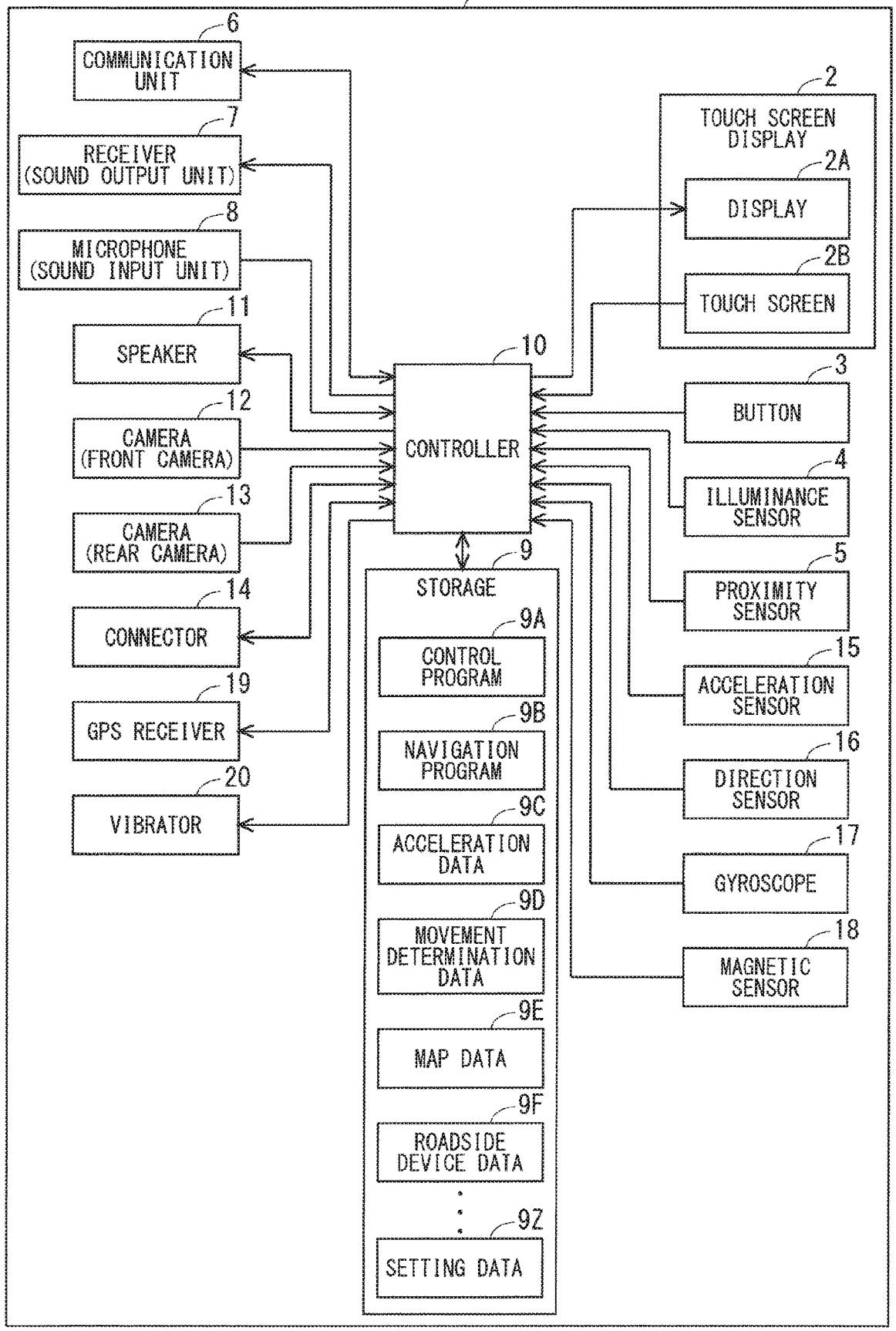
FIG. 1 illustrates a block diagram showing an example of a functional configuration of a smartphone according to an embodiment.

FIG. 1 illustrates a block diagram showing an example of a functional configuration of a smartphone according to an embodiment. In the following description, the same reference numerals are given to the same components in some cases. In the following description, redundant descriptions may be omitted. In the following description, the smartphone 1 may be referred to as "self-device" in some cases.

As illustrated in FIG. 1, the smartphone 1 includes a touch screen display 2, a button 3, an illuminance sensor 4, a proximity sensor 5, a communication unit 6, a receiver 7, a microphone 8, a storage 9, a controller 10, a speaker 11, a camera 12, a camera 13, a connector 14, an acceleration sensor 15, a direction sensor 16, a gyroscope 17, and a magnetic sensor 18.

The touch screen display 2 includes a display 2A and a touch screen 2B. For example, the display 2A and the touch screen 2B may overlap each other, may be positioned side by side or separated from each other. When the display 2A and the touch screen 2B overlap each other, for example, one or a plurality of sides of the display 2A may not be along either side of the touch screen 2B.

The display 2A includes a display device such as a Liquid Crystal Display (LCD), an Organic Electro-Luminescence Display (OELD), an inorganic Electro-Luminescence Display (IELD), and so forth. The display 2A displays objects such as characters, images, symbols, graphics, and so forth. The screen including the object displayed by the display 2A includes a screen referred to as a lock screen, a screen referred to as a home screen, and an application screen displayed during the execution of the application. The home screen may be referred to as a desktop, a standby screen, an idle screen, a standard screen, an application list screen or a launcher screen.

The touch screen 2B detects contact or approach of an operator, such as a finger, a pen, a stylus pen, or the like, with respect to the touch screen 2B. The touch screen 2B can detect a position on the touch screen 2B where an operator, such as a plurality of fingers, a pen, a stylus pen, or the like touches or approaches the touch screen 2B. In the following description, a position at which an operator such as a plurality of fingers, a pen, a stylus pen, and so forth detected by the touch screen 2B contacts to or approaches the touch screen 2B is referred to as "detected position". The touch screen 2B notifies the controller 10 of the contact or approach of the operator to the touch screen 2B along with the detected position. The touch screen 2B may notify the controller 10 of the detection of the contact or approach by notifying the detected position. The operation the touch screen 2B can perform can be executed by the touch screen display 2 including the touch screen 2B. In other words, the operation performed by the touch screen 2B may be performed by the touch screen display 2.

The controller 10 can determine a type of a gesture based on at least one of the contact or approach detected by the touch screen 2B, the detected position, a change in the detection position, a duration time during which the contact or approach continues, the temporal interval at which the contact or approach is detected, and the number of times contact is detected. The operation the controller 10 can perform can be executed by the smartphone 1 including the controller 10. In other words, the operation performed by the controller 10 may be performed by the smartphone 1. The gesture indicates an operation performed on the touch screen 2B using a finger. The operation performed on the touch screen 2B may be performed on the touch screen display 2 including the touch screen 2B. A gesture the controller 10 determines via the touch screen 2B includes, but not limited to, touch, long touch, release, swipe, tap, double tap, long tap, drag, flick, pinch in, and pinch out.

The detection method of the touch screen 2B may include an arbitrary method such as an electrostatic capacitance method, a resistive film method, a surface acoustic wave method, an infrared method, and a load detection method.

The button 3 receives an operation input from the user. The number of buttons 3 may be singular or plural.

The illuminance sensor 4 can detect the illuminance. The illuminance is a value of a luminous flux incident on a unit area of a measurement surface of the illuminance sensor 4. The illuminance sensor 4 is used, for example, for adjusting the luminance of the display 2A.

The proximity sensor 5 can detect presence of a neighboring object in a noncontact manner. The proximity sensor 5 detects the presence of an object based on a change in a magnetic field, a change in a feedback time of a reflected wave of an ultrasonic wave, and so forth. The proximity sensor 5 detects, for example, that a face has approached toward the display 2A. The illuminance sensor 4 and the proximity sensor 5 may be configured as one sensor. The illuminance sensor 4 may be used as a proximity sensor.

The communication unit 6 can communicate wirelessly. The wireless communication standards supported by the communication unit 6 include cellular phone communication standards such as 2G (generation), 3G (generation), 4G (generation), 5G (generation) and so forth, and short-range wireless communication standards. The cellular phone communication standards include such as Long Term Evolution (LTE), Wideband Code Division Multiple Access (W-CDMA), Worldwide Interoperability for Microwave Access (WiMAX) (registered trademark), CDMA 2000, Personal Digital Cellular (PDC), Global System for Mobile Communications (GSM) (registered trademark), Personal Handy-phone System (PHS), and so forth. The short-range wireless communication standards include such as IEEE 802.11, Bluetooth (registered trademark), Infrared Data Association (IrDA), Near Field Communication (NFC), Wireless Personal Area Network (WPAN), and the like. ZigBee (registered trademark), for example, may be included in the WPAN communication standard. The communication unit 6 may support one or more of the communication standards described above. In an example of an embodiment, the communication unit 6 further supports, for example, a plurality of communication standards for enabling communication with a roadside device installed near an intersection. In one example of an embodiment, the communication unit 6 can receive a radio wave transmitted from the roadside device that transmits the radio wave that can be received by a device within a predetermined communication area including an intersection.

The receiver 7 can output a sound signal delivered from the controller 10 as a sound. The receiver 7 can output, for example, the sound of a moving picture played back by the smartphone 1, the sound of music, and the voice of the other party at the time of a call. The microphone 8 can convert the voice or the like of the user to be input into a sound signal and transmit it to the controller 10.

The speaker 11 can output a sound signal delivered from the controller 10 as a sound. The speaker 11 is also used, for example, to output the sound of ringtone and a piece of music. Either the receiver 7 or the speaker 11 may also serve as the function of the other.

The camera 12 and the camera 13 convert the photographed image into an electric signal. The camera 12 is a front camera that photographs an object facing the front face 2A. The camera 13 is a rear camera that photographs an object facing the opposite face of the display 2A. The camera 12 and the camera 13 may be mounted on the smartphone 1 in a functionally and physically integrated state as a camera unit usable by switching between the front camera and the rear camera.

The connector 14 is a terminal to which another device is connected. The connector 14 may be a general-purpose terminal such as a Universal Serial Bus (USB), a High-Definition Multimedia interface (registered trademark) (HDMI), a Light Peak (Thunderbolt (registered trademark)), an earphone microphone connector. The connector 14 may be a dedicated terminal such as a Dock connector. Devices connected to the connector 14 include, but not limited to, an external storage, a speaker, and a communication device, for example.

The acceleration sensor 15 can measure the direction and magnitude of the acceleration acting on the smartphone 1. The detection result of the acceleration sensor 15 is stored in the storage 9 as the acceleration data 9C. The acceleration sensor 15 is an example of an acceleration sensor. For example, the direction sensor 16 detects the direction of the geomagnetism and can measure the orientation (azimuth) of the smartphone 1 based on the direction of the geomagnetism. The gyroscope 17 detects the angle and angular velocity of the smartphone 1. The magnetic sensor 18 detects the magnetic force around the smartphone 1.

The smartphone 1 may include a GPS receiver 19 and a vibrator 20 in addition to the above-described functional units. The GPS receiver 19 receives a radio wave signal of a predetermined frequency band from a GPS satellite. The GPS receiver 19 demodulates the received radio wave signal and delivers the processed signal to the controller 10. The GPS receiver supports arithmetic processing for the current position of the smartphone 1. The smartphone 1 may include a receiver capable of receiving signals from satellites for positioning other than GPS satellites and may perform arithmetic processing for determining the current position. It can be said that the GPS receiver 19 and the functional unit (for example, the controller 10) that controls the arithmetic processing are position acquisition units. The smartphone 1 may include receivers of a plurality of types of positioning satellites. The positioning satellites other than the GPS satellites include, for example, a satellite of Global Navigation Satellite System (GLONASS), an artificial satellite of Indian Regional Navigational Satellite System (IRNSS), a satellite of COMPASS, a satellite of GALILEO, and so forth. The vibrator 20 vibrates part or the whole of the smartphone 1. The vibrator 20 includes, for example, a piezoelectric element, an eccentric motor or the like in order to generate vibration. The smartphone 1 implements a functional unit inevitably used for maintaining the function of the smartphone 1, such as a battery, and a control unit inevitably used for realizing control of the smartphone 1.

The storage 9 can store programs and data. The storage 9 may be used as a work area for temporarily storing processing results of the controller 10. The storage 9 may include any non-transitory storage medium such as a semiconductor storage medium and a magnetic storage medium. The storage 9 may include a plurality of types of storage media. The storage 9 may include a combination of a storage medium such as a memory card, an optical disk, or a magneto-optical disk and a reading device of the storage medium. The storage 9 may include a storage device used as a temporary storage area such as a Random Access Memory (RAM).

The program stored in the storage 9 includes an application executed in the foreground or the background and a support program (not shown) for supporting the operation of the application. The application displays a screen according to the application on the display 2A, for example, if it is executed in the foreground. The support program includes, for example, an OS. The program may be installed in the storage 9 via the wireless communication by the communication unit 6 or the non-transitory storage medium.

The storage 9 can store a control program 9A, a navigation program 9B, acceleration data 9C, movement determination data 9D, map data 9E, roadside device data 9F, setting data 9Z, and so forth. The control program 9A can cooperate with various applications when providing various functions. The control program 9A may cooperate with the cloud storage via the communication unit 6 to access files and data stored in the cloud storage. The cloud storage may store part or all of the programs and data to be stored in the storage 9.

The control program 9A can provide functions related to the operation of the smartphone 1. In one example of an embodiment, the control program 9A can provide the following functions.

The control program 9A can provide a function for determining whether the user of the self-device is in a moving state. The control program 9A may provide a function of determining whether it is in a moving state from a transition of the position information of the user, or provide a function of determining whether it is in a moving state based on the detection result of the acceleration sensor 15.

The control program 9A can provide a function of generating information indicating the trajectory of the movement of the user based on the transition of the position information of the user of the self-device. The control program 9A can provide a function of executing at least one of notification of attention to the user and notification to outside if the control program 9A detects a sign that the user is to cross the road based on the positional relationship between the position of the road on the map corresponding to the current position of the user and the trajectory of the movement of the user. For example, the control program 9A can provide a function of detecting the sign that the user is to cross the road if the position of the road on the map and the trajectory of the movement of the user intersect not a little. Specifically, for example, the control program 9A may provide a function of detecting the sign that the user is to cross the road if the trajectory of the movement of the user approaches a position of the road on the map up to a predetermined distance.

The control program 94 can provide a function in which if the sign that the user of the self-device is to cross a road is detected, whether the road (hereinafter also referred to as a crossing detection road) is a road which is determined that the notification should be made is determined, and if the crossing detection road is a road which is determined that the notification should be made, the notification is executed. The control program 9A can provide, for example, a function in which whether the road in which the sign of crossing by the user is detected is a crosswalk is specified based on the map information corresponding to the current position of the user, and if the detected crossing detection road is not a crosswalk, the crossing detection road in which the sign of crossing by the user is detected is determined to be the road which is determined that the notification should be made.

The control program 9A can provide a function in which a width of the crossing detection road in which the sign of crossing by the user is detected is further specified based on the map information corresponding to the current position of the user if the detected crossing detection road in which the sign of crossing by the user is detected is not a crosswalk, and if the specified width exceeds a threshold (hereinafter also referred to as a width reference value), the crossing detection road in which the sign of crossing by the user is detected is determined to be the road which is determined that the notification should be made.

The control program 9A can also provide a function in which whether the crossing detection road in which the sign of crossing by the user is detected is determined to be the road which is determined that the notification should be made based on the presence or absence of confirmation of communication with the road side device. That is, the control program 9A provides a function in which if a radio wave transmitted from the roadside device can be received, it estimates that the user is crossing the road near the intersection and that the user is passing through the crosswalk and determines that the crossing detection road is not the road which is determined that the notification should be made.

The control program 9A can also provide a function in which whether the crossing detection road in which the sign of crossing by the user is detected is determined to be the road which is determined that the notification should be made based on information indicating the presence or absence of passage permission of the user transmitted from the roadside device installed in the vicinity of a traffic light device for a pedestrian or a bicycle. For example, the information indicating the presence or absence of passage permission of the user includes information indicating that a traffic light device for a pedestrian or a bicycle causes a luminous body of red to emit light. For example, information that does not permit the notification includes information indicating that a traffic light device for a pedestrian or a bicycle causes a luminous body of green to emit light.

It should be noted that, when a traffic light device for a pedestrian or a bicycle emits the light emitter of red light, a pedestrians or a bicycle must not cross the road. When a traffic light device for a pedestrian or a bicycle emits the light emitter of green light, a pedestrians or a bicycle may cross the road. That is, the control program 9A can provide a function in which, if the information indicating that a traffic light device for a pedestrian or a bicycle causes a luminous body of red to emit light is received, it estimates that the user is crossing the road near the intersection and that the user is not permitted to cross the road and determines that the crossing detection road is the road which is determined that the notification should be made. In addition, the control program 9A can provide a function in which, if the information indicating that a traffic light device for a pedestrian or a bicycle causes a luminous body of green to emit light is received, it estimates that the user is permitted to cross the road and determines that the crossing detection road is not the road which is determined that the notification should be made.

The notification of alarming to the user of the self-device executed in the case where the crossing detection road is determined to be the road which is determined that the notification should be made includes at least one of output of sound or voice from the speaker 11 and vibration of the vibrator. The notification to outside executed in the case where the crossing detection road is determined to be the road which is determined that the notification should be made includes at least one of output of sound or voice from the speaker 11, light emission by lighting and blinking of Light Emitting Diode (LED) or backlight of the touch screen display 2, transmission of a message from the self-device to the roadside device, and transmission of a message from the self-device to the vehicle.

The navigation program 9B can provide a function of searching for a route from the departure point to the destination based on the map information in accordance with the request of the user of the self-device and a function of displaying route information for guiding the user to the destination based on the searched route on the touch screen display 2, it should be noted that the controller 10 may search a route from the current position of the user to the destination and generate the route information indicating the route by executing the navigation program 9B based on the information on the destination input by the user, the current position of the user acquired by a position acquisition unit, and the map information stored in the storage 9.

The acceleration data 9C is data of the detection result by the acceleration sensor 15. The acceleration data 9C includes a value of the acceleration acquired by the acceleration sensor 15, the direction of the acceleration, and the magnitude of the acceleration. The acceleration data 9C may include all measurement results measured by the acceleration sensor 15.

The movement determination data 9D is information on determination conditions used when determining the movement state of the user of the self-device. The information of the determination conditions may include an acceleration pattern formed of the direction and magnitude of the acceleration acting on the self-device and a time series change of the direction and magnitude of the acceleration, or a composite vector in which acceleration of three axes of the X axis, the Y axis, and the Z axis are composed. The information of the determination conditions includes at least information for determining whether the moving means of the user is an automobile or a train from the detection result of the acceleration sensor 15.

The map data 9E is data for causing the touch screen display 2 to display map information corresponding to the current position of the user of the self-device.

The roadside device data 9F is data used for communication with the roadside device. The roadside device data 9F includes, for example, information on a frequency band used between the smartphone 1 and the roadside device in a dedicated short range communication of the intelligent transportation system.

The setting data 9Z includes various setting information related to the operation of the smartphone 1. In an embodiment, the setting data 9Z includes a threshold (width reference value) for determining whether the crossing detection road in which the sign of crossing by the user of the self-device is detected is the road which is determined that the notification should be made. The setting data 9Z includes a notification mode for notifying the user of the attention and notifying the outside, and data (data indicating message content) relating to the message to be transmitted to the roadside device. The notification mode at the time of notifying the user of the attention may include a pattern using at least one of sound, light, and vibration. The notification mode at the time of notifying the outside may include a patter using at least one of sound, and light.

The controller 10 includes an arithmetic processing unit. The arithmetic processing unit may include, but not limited to, a Central Processing Unit (CPU), a System-on-a-Chip (SoC), a Micro Control Unit (MCU), and a Field-Programmable Gate Array (FPGA), and a processor. The controller 10 comprehensively controls the operation of the smartphone 1 to realize various functions. The controller 10 is an example of a control unit.

The controller 10 can also be said to be a control circuit. The controller 10 includes at least one processor to provide control and processing capabilities to execute various functions, as described in further detail below.

According to embodiments, the at least one processor may be implemented as a single integrated circuit (IC) or as a plurality of communicably coupled integrated circuits IC and/or discrete circuits. The at least one processor can be implemented in accordance with various known techniques.

In one embodiment, the processor includes one or more circuits or units configured to perform one or more data calculation procedures or processes, for example, by executing instructions stored in an associated memory. In other embodiments, the processor may be firmware (for example, a discreet logic component) configured to perform one or more data calculation procedures or processes.

According to embodiments, the processor may be one or more of a processor, a controller, a microprocessor, a microcontroller, an Application-Specific Integrated Circuit (ASIC), a digital signal processor, a programmable logic device, a field programmable gate array, or any combination of the devices or configurations or combinations of other known devices and configurations may execute the functions described below.

Specifically, the controller 10 executes an instruction included in the program stored in the storage 9 while referring to the data stored in the storage 9 as necessary. And, the controller 10 controls the functional unit in accordance with the data and the instruction, thereby realizing various functions. The functional unit includes, but not limited to, the display 2A, the communication unit 6, the microphone 8, and the speaker 11, for example. The controller 10 may change the control in accordance with the detection result of the detection unit. The detection unit includes, but not limited to, the touch screen 2B, the button 3, the illuminance sensor 4, the proximity sensor 5, the microphone 8, the camera 12, the camera 13, the acceleration sensor 15, the direction sensor 16, the gyroscope 17, and the magnetic sensor 18, for example.

The controller 10 can realize the process of calculating the trajectory of the movement of the user based on the transition of the position information of the user of the self-device by executing the control program 9A. For example, the controller 10 may acquire the position information of the user using the function of the GPS receiver 19, and generate the time series data of the position information of the user as the trajectory information indicating the trajectory of the movement of the user.

Also, the controller 10, by executing program 9A, can realize the process of executing at least one of notification of attention to the user and notification to outside if the sign that the user is to cross the road is detected based on the positional relationship between the position of the road on the map information corresponding to the current position of the user and the trajectory of the movement of the user.

A specific example of a detection method of the sign is described below. It should be noted that, as an example, a road including a roadway on which a vehicle such as an automobile runs and a pair of sidewalks extending along the roadway and sandwiching the roadway is assumed. The user may travel from one sidewalk to the other sideway across the roadway.

For example, the controller 10 generates estimated direction information indicating a direction in which the user moves hereinafter also referred to as an estimated direction) based on the trajectory information. As a more specific example, the controller 10 may calculate, as the estimated direction, the direction of a straight line passing through the position of the user acquired this time with the position of the user acquired last time as the start point.

The controller 10 determines whether or not the estimated direction intersects the extending direction of the road where the user is located at an angle larger than a certain angle reference value (for example, 70 degrees). The angle reference value is preset, for example, and may be included in the setting data 9Z, for example. The controller 10 can extract the extending direction of the road from the map information. The controller 10 may determine that there is the sign that the user is to cross the road if it is determined that the estimated direction intersects the extending direction of the road at an angle larger than the angle reference value.

Further, the controller 10 may calculate a distance (for example, a shortest distance) between the current position of the user and the roadway, and may determine whether or not the distance is shorter than the distance reference value. The controller 10 may determine that there is the sign if it is determined that the estimated direction intersects the extending direction of the road at an angle larger than the angle reference value and the distance between the current position of the user and roadway is shorter than the distance reference value.

The user may be located at an intersection where a plurality of roads intersect. For example, a first road and a second road intersecting at an intersection are assumed. In the case where the user is traveling toward the intersection along the sidewalk of the second road and still is away from the intersection, at this point, estimation whether the user is to cross the first road at the intersection, or turns the intersection without crossing the first road is difficult to make. Meanwhile, when the user is located just in front of the roadway of the first road, and the user is moving in the direction orthogonal to the extending direction of the first road, estimation can be made that the user is to cross the roadway of the first road.

Therefore, the controller 10 may detect the sign of crossing by the user for the first road if it is determined that the estimated direction of the user intersects the extending direction of the first road at an angle larger than the angle reference value and the distance between the current position of the user and the roadway of the first road is shorter than the distance reference value. Similarly, the controller 10 may detect the sign of crossing of the user for the second road if it is determined that the estimated direction of the user intersects the extending direction of the second road at an angle larger than the angle reference value and the distance between the current position of the user and the roadway of the second road is shorter than the distance reference value.

Alternatively, if the controller 10 detects the sign that the user of the self-device is to cross the road, the controller 10 determines whether the road (crossing detection road) is the road which is determined that the notification should be made, and if the road (crossing detection road) is the road which is determined that the notification should be made, the process of executing the notification can be executed.

For example, the controller 10 may determine whether or not the user is about to cross the road through the crosswalk based on the transition (history information) of the position of the user and the position of the crosswalk. Information indicating the position of a crosswalk is included in the map information. A specific example of the determination method will be described below.

For example, the controller 10 calculates an estimated route that the user is expected to move based on the history information. More specifically, the controller 10 may calculate a line segment extending along the estimated direction as the estimated route with the current position of the user as a start point. The controller 10 may determine whether or not the estimated route intersects the roadway at the crosswalk, for example, if the sign of crossing of the road by the user is detected. If the controller 10 determines that the estimated route intersects the roadway at the crosswalk, the controller 10 determines that the user is about to cross the road through the crosswalk and determines that the notification should not be made. Meanwhile, the controller 10 may determine that the notification should be made if it is determined that the estimated route intersects the roadway other than the crosswalk.

Alternatively, the controller 10 may determine whether the width of the road is wider than the width reference value, if it is determined that the user is about to cross the road other than the crosswalk. Information indicating the width of the road is included in the map information. The width reference value is preset, for example, and may be included in the setting data 9Z, for example. If the width of the road is wider than the width reference value, the controller 10 may determine that notification should be made. If the width of the road is narrower than the width reference value, the controller 10 may determine that the notification should not be made. That is, when the user crosses the road at a place where there is no crosswalk, if the width of the road is narrow, no notification is made, while if the width of the road is wide the notification is made. Accordingly, the notification can be made for a wide road where the traffic of the vehicles tends to be heavy. Meanwhile, no notification is made for a narrow road where the traffic tends to be light. Accordingly, notification with low necessity can be suppressed or avoided.

Alternatively, the controller 10 may determine whether or not a radio wave from the roadside device installed in the vicinity of the crosswalk is receivable if the sign of crossing of the road by the user is detected. If the radio wave transmitted from the roadside device can be received, the controller 10 may determine that the notification should not be made, and if the radio wave transmitted from the roadside device cannot be received, the controller 10 may determine that the notification should be made.

Alternatively, if the radio wave transmitted from the roadside device can be received, the controller 10 may determine whether or not the radio wave contains display information of the traffic light device. The display information is information of passage propriety indicated by the traffic light device. For example, the traffic light device causes the red light emitter to emit light, so that the traffic light device indicates to the surroundings that the crosswalk corresponding to the self-device is not allowed to pass. The display information is information indicating this passage propriety.

If the display information of the crosswalk across which the user is to cross indicates that the passage is not allowed, the controller 10 determines that the notification should be made, and if the display information indicates that the passage is allowed, the controller 10 determines that the notification should not be made.

Figure 2:
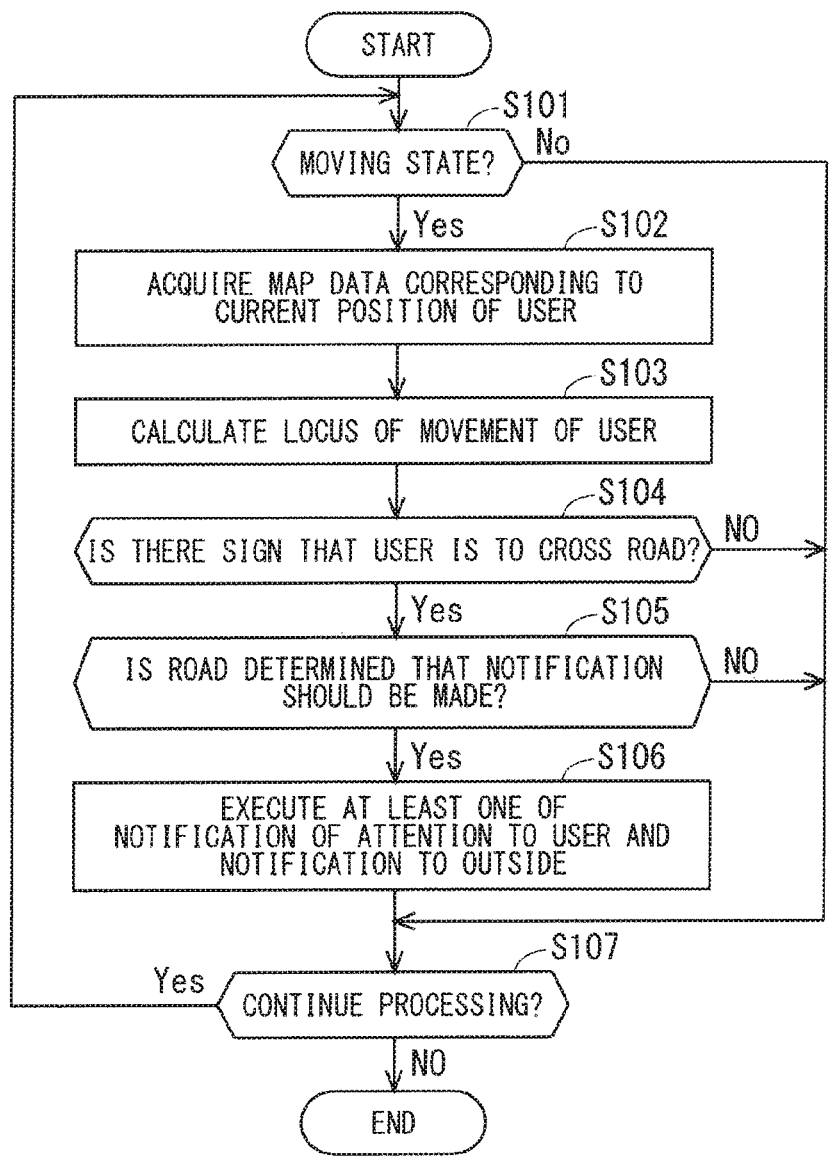
FIG. 2 illustrates a flowchart showing an example of a flow of processing executed by the smartphone according to an embodiment.

The flow of processing executed by the smartphone 1 according to an embodiment will be described with reference to FIG. 2, FIG. 2 illustrates a flowchart showing an example of the flow of processing executed by the smartphone according to an embodiment. The processing shown in FIG. 2 is realized by executing the control program 9A stored in the storage 9 by the controller 10.

As shown in FIG. 2, the controller 10 determines whether the state of the user is in a moving state (step S101).

As a result of the determination, if the state of the user is in the moving state (Yes in step S101), the controller 10 acquires the current position of the user from the position acquisition unit (including, for example, the GPS receiver 19), and from the map data 9E, the controller 10 acquires map data corresponding to the current position of the user (step S102).

Subsequently, the controller 10 calculates the trajectory of the movement of the user (step S103). For example, the controller 10 may generate the time series data of the position information of the user as the trajectory information indicating the trajectory.

Subsequently, based on the positional relationship between the position of the road on the map corresponding to the current position of the user specified from the map data acquired in step S102 and the trajectory of movement of the user, the controller 10 determines whether there is the sign that the user is to cross the road (step S104).

As a result of the determination, if there is the sign that the user is to cross the road (Yes in step S104), the controller 10 determines whether the road (crossing detection road) in which the sign of crossing by the user is detected is the road which is determined that the notification should be made (Step S105).

As a result of the determination, if the crossing detection road is the road which is determined that the notification should be made (Yes in step S105), the controller 10 executes at least one of notification of attention to the user and notification to outside (Step S106). For example, if the road in which the sign of crossing by the user is detected is not a crosswalk, or if it is not a crosswalk, and the width of the road exceeds a threshold (width reference value), the controller 10 determines the crossing detection road is the road which is determined that the notification should be made. For example, if the road in which the sign of crossing by the user is detected is not a crosswalk, and the width of the road exceeds a threshold, the controller 10 determines the crossing detection road is the road which is determined that the notification should be made. For example, if the communication with the roadside device is confirmed, the controller 10 determines that the crossing detection road is not the road which is determined that the notification should be made.

Subsequently, the controller 10 determines whether to continue the processing (step S107). The condition for determining whether to continue the processing may be set appropriately. For example, if the termination input of processing by the user is not made, the controller 10 determines to continue the processing, and if the termination input is made, the controller 10 may determine not to continue the processing.

As a result of the determination, if the processing is to be continued (Yes in step S107), the controller 10 executes again the determination in step S101. Conversely, if the processing is not to be continued in step S107, the controller 10 terminates the processing shown in FIG. 2.

In the above step S105, as a result of the determination, if the crossing detection road is not the road which is determined that the notification should be made (No in step S105), the controller 10 executes the determination in above step S107.

In the above step S104, as a result of the determination, if there is no sign that the user is to cross the road (No in step S104), the controller 10 executes the determination in above step S107.

In the above step S101, as a result of the determination, if it is not in the moving state, (No in step S101), the controller 10 executes the determination in above step S107, In an above embodiment, if the sign that the user is to cross the road is determined based on the positional relationship between the position on the road corresponding to the current position of the user and the trajectory of the movement of the user, the smartphone 1 executes at least one of notification of attention to the user and notification to outside on the condition that the crossing detection road is the road which is determined that the notification should be made. Therefore, according to the above-described embodiments, the behavior of the user crossing the predetermined road which is determined that the notification should be made can be grasped as a dangerous action, the notification of attention can be performed, and the notification performed by electronic devices can be improved.

Further, according to the above-described embodiments, if the width of the road exceeds the threshold value, the smartphone 1 determines that the crossing detection road is the road which is determined that notification should be made, therefore, for example, the smartphone 1 may be controlled to execute the determination whether the sign that the user is to cross the road if a road is a road with a high traffic volume such as a highway in which the width of the road is equal to or greater than a certain width.

Further, according to the above-described embodiments, if the communication with the roadside device is confirmed, the smartphone 1 determines that the crossing detection road is not the road which is determined that notification should be made, therefore, for example, the smartphone 1 may be controlled not to execute the determination whether the sign that the user is to cross the road by estimating crossing of the road near the intersection is crossing of the crosswalk.

In the above embodiments, the smartphone 1 may execute sign detection of the road crossing by the user if the moving means of the user is determined to be other than the automobile and the train. An embodiment in this case will be described below.

The control program 9A can provide a function of acquiring the detection result of the acceleration sensor 15 and executing the sign detection of the road crossing by the user if the moving means of the user is determined to be other than the automobile and the train based on the acquired detection result.

The controller 10, by executing the control program 9A, may acquire the detection result of the acceleration sensor 15, and realize the processing to execute the sign detection of the road crossing by the user if a state in which the user is moving with the moving means other than the automobile and the train is determined based on the acquired detection result. For example, the controller 10 can specify the moving means based on the information for determining the moving state included in the movement determination data 9D and the detection result of the acceleration sensor 15.

Figure 3:
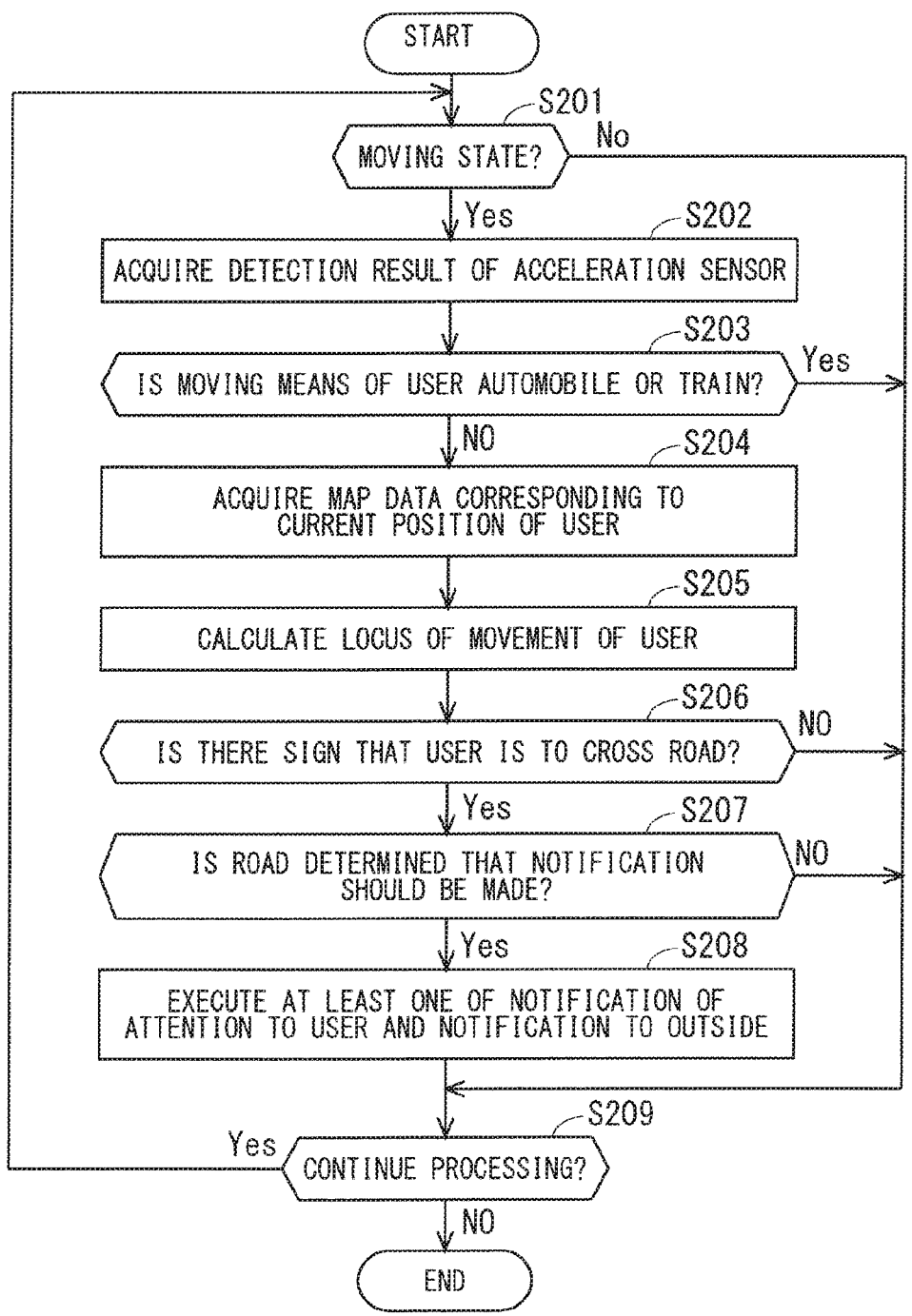
FIG. 3 illustrates a flowchart showing an example of a flow of processing executed by the smartphone according to another embodiment.

The flow of processing executed by the smartphone 1 according to another embodiment will be described with reference to FIG. 3. FIG. 3 illustrates a flowchart showing an example of a flow of processing executed by the smartphone according to another embodiment. The processing shown in FIG. 3 is realized by executing the control program 9A stored in the storage 9 by the controller 10.

As shown in FIG. 3, the controller 10 determines whether the state of the user is in the moving state (step S201).

As a result of the determination, if the state of the user is in the moving state (Yes in step S201), the controller 10 acquires the detection result (acceleration data 9C) of the acceleration sensor 15 (step S202).

Subsequently, based on the detection result of the acceleration sensor 15 acquired in step S202, the controller 10 determines whether the moving means of the user is an automobile or a train (step S203).

As a result of the determination, if the user's moving means is not an automobile or a train (No in step S203), the controller 10 acquires map data corresponding to the current position of the user from the map data 9E (step S204).

Subsequently, the controller 10 calculates the trajectory of the movement of the user (step S205). For example, the controller 10 may generate the time series data of the position information of the user as the trajectory information.

Subsequently, based on the positional relationship between the position of the road on the map corresponding to the current position of the user specified from the map data acquired in step S204 and the trajectory of movement of the user calculated in step S205, the controller 10 determines whether there is the sign that the user is to cross the road (step S206).

As a result of the determination, if there is the sign that the user is to cross the road (Yes in step S206), the controller 10 determines whether the road (crossing detection road) in which the sign of crossing by the user is detected is the road which is determined that the notification should be made (Step S207).

As a result of the determination, if the crossing detection road is the road which is determined that the notification should be made (Yes in step S207), the controller 10 executes at least one of notification of attention to the user and notification to outside.

Subsequently, the controller 10 determines whether to continue the processing (step S209).

As a result of the determination, if the processing is to be continued (Yes in step S209), the controller 10 returns the determination in above step S201. Conversely, as a result of the determination, if the processing is not to be continued (No in step S209), the controller 10 terminates the processing showing in FIG. 3.

In the above step S207, as a result of the determination, if the crossing detection road is not the road which is determined that the notification should be made (No in step S105), the controller 10 executes the determination in step S207.

In the above step S206, as a result of the determination, if there is no sign that the user is to cross the road (No in step S206), the controller 10 executes the determination in above step S209.

In the above step S203, as a result of the determination, if the moving means of the user is an automobile or a train (Yes in step S203) the controller 10 executes the determination in above step S209.

In the above step S201, as a result of the determination, if the state of the user is not in the moving state, (No in step S201), the controller 10 executes the determination in above step S209.

According to the above-described other embodiments, if the moving means of the user is an automobile or a train, that is, if there are no concerns to cross the road, the controller 10 does not perform determination whether there is the sign that the user is to cross the road.

In the embodiments described above, when the smartphone 1 executes the navigation program 9B to provide the user with route guidance information, if the smartphone 1, by cooperating with the navigation program 93, detects that the trajectory of the movement of the user deviates from the rout corresponding to the route information, the smartphone 1 may shorten the interval of acquiring the position information of the user. That is, the controller 10 may set an acquisition interval of the position information when the position of the user deviates from the route to be shorter than an acquisition interval of the position information when the position of the user is on the route. Alternatively, the smartphone 1 may detect a change in the traveling direction of the user based on the detection results of the gyroscope 17 and the magnetic sensor 18, and if there is a change in the traveling direction, the smartphone 1 may shorten the acquisition interval of the position information of the user. As described above, the smartphone 1 can enhance the estimation precision of the sign of crossing of the road by the user, with the deviation of the user from the scheduled behavior as a start, by grasping the current position of the user in detail.

In the present specification, embodiments have been described for clearly disclosing electronic devices. However, the electronic device should not be limited to the above-described embodiments, and should be configured to embody the configuration in which all modifications and alternatives that can be created by those skilled in the art within the scope of the basic matter described in the specification are applicable. For example, each embodiment can be combined with each other.

The invention claimed is:

1. An electronic device, comprising:
a non-transitory storage medium configured to store map data; and
at least one processor configured to generate information indicating a trajectory of a user's movement based on a transition of a position of the user of the electronic device,
wherein the at least one processor is further configured to:
acquire the map data corresponding to a current position of the user;
detect that the user is to cross a road based on a positional relationship between a position of the road on a map specified from the acquired map data and the trajectory of the user's movement;
in response to the detection of crossing the road, perform a determination whether a notification should be made based on information on the road;
when the information indicates that the road is not a crosswalk, determine that the notification should be made, execute at least one of a user notification to the user and an outside notification to outside, and continue generating the information indicating the trajectory of the user's movement; and
when the information indicates that the road is a crosswalk, determine that the notification should not be made, and continue generating the information indicating the trajectory of the user's movement, the at least one processor determines that the notification should not be made whenever the information indicates that the road is a crosswalk.

2. The electronic device according to claim 1, wherein the at least one processor is further configured to
determine whether the detected road is a crosswalk based on map data corresponding to the current position of the user; and
determine that the notification should be made when the detected road is not a crosswalk.

3. The electronic device according to claim 2, wherein the at least one processor is further configured to
identify a width of the detected road based on the map data corresponding to the current position of the user when the detected road is not a crosswalk, and
determine that the notification should be made when the identified width exceeds a threshold.

4. The electronic device according to claim 1, wherein the at least one processor is further configured to determine whether the notification should be made based on presence or absence of confirmation of communication with a roadside device, wherein the roadside device is installed on the detected road.

5. The electronic device according to claim 1, wherein the at least one processor is further configured to
provide route information for guidance based on a request from the user, and
shorten an interval of acquiring the position information of the user when the trajectory of the user's movement deviates from a route corresponding to the route information.

6. The electronic device according to claim 1, wherein the notification to the user includes at least one of the following: output of sound from the electronic device, output of voice from the electronic device, and vibration of the electronic device.

7. The electronic device according to claim 1, wherein the notification to outside includes at least one of the following: output of sound from the electronic device, output of voice from the electronic device, light emission of the electronic device, and transmission of a message from the electronic device to a roadside device.

8. The electronic device according to claim 1, wherein the at least one processor is further configured to determine that the notification should be made based on information indicating presence or absence of passage permission of the user transmitted from a roadside device, wherein the roadside device is installed on the detected road.

9. A control method executed by an electronic device including a non-transitory storage medium configured to store map data, the method comprising the steps of:
measuring, by using an acceleration sensor, acceleration of the electronic device;
generating information indicating a trajectory of a user's movement based on a transition of a position of the user of the electronic device;
acquiring the map data corresponding to a current position of the user;
detecting that the user is to cross a road based on a positional relationship between a position of the road on a map specified from the acquired map data and the trajectory of the user's movement;
in response to the detection of crossing the road, performing a determination whether a notification should be made based on information on the road;
when the information indicates that the road is not a crosswalk, determining that the notification should be made, executing at least one of a user notification to the user and an outside notification to outside, and continuing generating the information indicating the trajectory of the user's movement;
when the information indicates that the road is a crosswalk, determining that the notification should not be made, and continuing generating the information indicating the trajectory of the user's movement, wherein it is determined that the notification should not be made whenever the information indicates that the road is a crosswalk; and
determining whether the user is to cross the road based on the positional relationship when it is determined that the user is moving with a moving means other than an automobile or a train based on the measured acceleration.

10. A non-transitory computer-readable medium storing a control program, the control program configured to control an electronic device to execute the steps of:
generating information indicating a trajectory of a user's movement based on a transition of a position of the user of the electronic device;
acquiring map data corresponding to a current position of the user;
detecting that the user is to cross a road based on a positional relationship between a position of the road on a map specified from the acquired map data and the trajectory of the user's movement;
in response to the detection of crossing the road, performing a determination whether a notification should be made based on information on the road;
when the information indicates that the road is not a crosswalk, determining that the notification should be made, executing at least one of a user notification to the user and an outside notification to outside, and continuing generating the information indicating the trajectory of the user's movement; and when the information indicates that the road is a crosswalk, determining that the notification should not be made, and continuing generating the information indicating the trajectory of the user's movement, wherein it is determined that the notification should not be made whenever the information indicates that the road is a crosswalk.

11. The electronic device according to claim 1, further comprising:
an acceleration sensor configured to measure acceleration of the electronic device,
wherein the at least one processor is further configured to
determine whether the user is moving with an automobile based on the measured acceleration,
determine whether the user is moving with a train based on the measured acceleration, and
determine whether the user is to cross the road based on the positional relationship when it is determined that the user is moving with a moving means other than the automobile or the train.

12. The control method according to claim 9, wherein the determining whether the user is to cross the road comprises:
determining whether the user is moving with an automobile based on the measured acceleration;
determining whether the user is moving with a train based on the measured acceleration; and
determining whether the user is to cross the road based on the positional relationship when it is determined that the user is moving with a moving means other than the automobile or the train.

13. The non-transitory computer-readable medium according to claim 10, further comprising:
measuring, by using an acceleration sensor, acceleration of the electronic device;
determining whether the user is moving with an automobile based on the measured acceleration;
determining whether the user is moving with a train based on the measured acceleration; and
determining whether the user is to cross the road based on the positional relationship when it is determined that the user is moving with a moving means other than the automobile or the train.

* * * * *